May 27, 1969
R. S. SOLVIK ET AL
3,446,754
CATALYST ACTIVATION
Filed Dec. 3, 1965
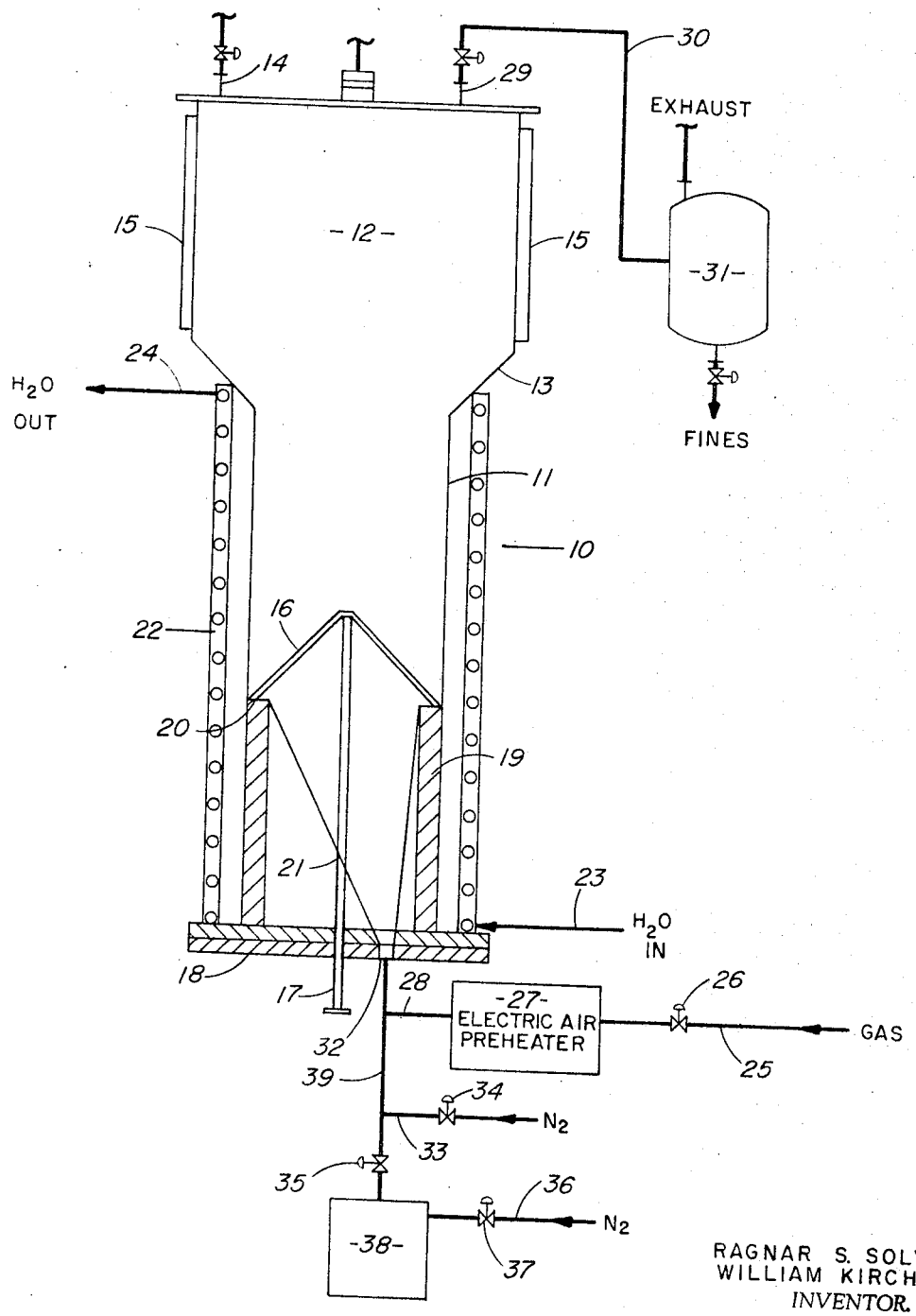
RAGNAR S. SOLVIK
WILLIAM KIRCH
INVENTOR.
BY
Allen B. Meyer United States Patent Office 3,446,754
Patented May 27, 1969

3,446,754
CATALYST ACTIVATION
Ragnar S. Solvik, Wyoming, and William Kirch, Cincinnati, Ohio, assignors to National Distillers and Chemical Corporation, New York, N.Y., a corporation of Virginia
Filed Dec. 3, 1965, Ser. No. 511,476
Int. Cl. B01j *11/06;* C08f *1/36*
U.S. Cl. 252—458        9 Claims

ABSTRACT OF THE DISCLOSURE

A chromium oxide catalyst containing a support such as silica, alumina, thoria, zirconia and the like, which is activated by inductive heating to a temperature of at least 1000° F., for at least 60 minutes.

---

This invention relates to a novel process for activating solid olefin polymerization catalysts. More specifically, it relates to an improved process for activating in a fluidized bed an ethylene or ethylene-alpha-olefin polymerization catalyst comprising chromium wherein a portion of the chromium is hexavalent as chromium oxide. Moreover, this invention relates to an improved process for the production of alpha-olefin homopolymers or copolymers which utilizes the activated catalyst produced in accordance with the herein disclosed novel activation process.

Conventional catalyst processes, especially those used in the polymerization art, activate chromium oxide type catalysts in a non-reducing atmosphere by drying and heating air externally and then passing it through a catalyst bed at a constant rate until the catalyst reaches a desired temperature. The catalyst is normally held at this temperature for a specified period of time. If external heat is supplied to the system it normally is supplied by either (1) heating the walls of the activation chamber by passing hot gases or fluids through a jacket around the activation chamber, or by (2) affixing electrical resistance heaters to the outside surface of the activation chamber. Such an activation process is described in U.S. Letters Patent No. 2,825,721 to John P. Hogan et al.

It is an object of this invention to provide an improved process for activating solid olefin polymerization catalysts.

It is an object of this invention to provide an improved catalyst for the polymerization of alpha-olefins.

It is a further object of this invention to provide an improved process for the production of solid alpha-olefin homopolymers or copolymers which utilize the activated catalyst produced by the novel catalyst activation process.

Further objects will become apparent to those skilled in the art as the disclosure is more fully made.

In accordance with the present invention, there has been discovered an improved process for carrying out a catalyst activation which produces an unexpected and novel improvement in the polymerization properties of the activated catalyst vis-a-vis catalysts activated by the conventional methods described above.

The process of this invention comprises activating by induction heating a particulate chromium oxide catalyst by contacting, at activation temperatures achieved solely through the use of electromagnetic induction heating, the catalyst with a non-reducing gas at a velocity sufficient to maintain the catalyst in a fluidized state, maintaining the catalyst at activation temperature for a specified length of time, and thereafter collecting the activated catalyst in a dry container. The basic improvement over the prior art is the discovery that controlling and maintaining the desired activation temperatures by the use of electromagnetic induction modifies the properties of a conventional catalyst, while it is in the fluidized state, in some unknown manner, whereby a novel catalyst is produced. Use of this novel catalyst under polymerization conditions, as hereinafter described, produces polymers with properties unobtainable when catalysts activated in the conventional manner were used.

It has been found that polymers of lower molecular weight (i.e. higher melt index) are synthesized when catalysts activated in accordance with the present invention are utilized under proper polymerization conditions, as compared with polymers produced with catalysts activated by conventional hot air jacketed heating. Accordingly, the products of this novel process are more useful for conversion to finished products in conventional plastics conversion equipment.

This phenomenon has extreme importance in the field of the slurry polymerization processes (where these types of catalysts have found wide use) wherein the major variable for controlling polymer molecular weight has been synthesis temperature. In such processes, synthesis temperatures have to be maintained relatively low to prevent polymer softening or solubilizing, hence, polymer molecular weights are necessarily typically high (low melt index) which limits the ability to convert the polymers to finished products. The use of induction heating to activate and produce catalysts which synthesize lower molecular weight polymers for a given synthesis temperature greatly expands the area of operation of slurry-type reactors.

The catalysts suitable for activation as herein disclosed are, in general, supported chromium oxides which are well known in the art as to their composition and their use as polymerization catalysts. As set forth in U.S. 2,825,721 of Hogan et al., the catalyst may be prepared by depositing chromium oxide (e.g. $Cr_2O_3$) or a chromium compound calcinable to chromium oxide, on a suitable support and activating to leave part of the chromium on the support in hexavalent form. The support may be selected from one or more of the following members: silica, alumina, thoria, zirconia, silica-alumina, silica-thoria, silica-zirconia, acid treated clays, and other materials generally known in the art as catalyst supports. In its preferred form, the catalyst is a silica gel supported chromium oxide, wherein at least a portion of said chromium is in the hexavalent state.

As previously noted, the novel catalyst is obtained by inductively heating a chromium oxide catalyst at activation temperatures for a specified period of time under fluidized conditions. After such activation, the catalyst is cooled, purged with an inert gas, and collected in a dry container. The fluidizing gas is required to maintain the catalyst particles in a suspended and separated state wherein the inductive powers of the activation can easily reach and affect each catalyst particle. The fluidizing gas also helps to remove any water that may be contained in the catalyst and therefore assists in obtaining a dry, activated material. The novel activation is accomplished solely by inductively heating the fluidized catalyst at a temperature of about 1000° F., to about 2000° F., preferably about 1200° F., to about 1800 F., for 60 minutes to 20 hours, preferably 4 hours to 12 hours. This activation at elevated temperatures may be preceded by gradually inductively heating the fluidized catalyst particles to an intermediate temperature of approximately 400° F., to 800° F., and holding the particles at that temperature for 30 minutes to 2 hours.

An electromagnet induction coil operating at about 1 to 20 kilocycles, preferably 8 to 12 kilocycles, is wrapped about the fluidization portion of the activation apparatus to provide heat to the system via the inductive forces. A diagrammatic illustration of a suitable apparatus for the inductive activation of chromium oxide catalysts can be found in the figure.

The activator 10 is an elongated cylindrical chamber having a lower fluidization chamber 11 constructed of Inconel-X and an upper disengaging chamber 12 constructed of stainless steel. The upper disengaging chamber 12 is somewhat larger in cross-sectional area than the fluidization chamber 11 and is connected thereto by a stainless steel frusto-conical connecting section 13. The catalyst to be activated is charged to the activator through port 14 in chamber 12. Electrical strip heaters 15 are affixed to the outside of disengagement zone 12 to minimize heat loss and prevent readsorption of water by the catalyst.

At the bottom of the fluidization zone 11 there is a conical 200 mesh screen 16 affixed to a rod 17 extending through the bottom flange 18 of the catalyst activator through a water-cooled packing gland (not shown). An insert 19 affixed to the bottom flange 18 of the catalyst activator extends up into the activator and is machined at the top to provide a seat 20 for the conical screen 16 to prevent leakage of catalyst around the screen. A conical section 21 is positioned below the screen to facilitate discharge of the catalyst. An induction coil 22 is wrapped around fluidization zone 11 to provide heat to the system via inductive forces. In addition, the induction coil 22 extends somewhat below fluidization zone 11 to provide additional preheat to the fluidizing gas. Induction coil 22 is fabricated from copper tubing and is water cooled, the cooling water entering at 23 and leaving at 24. The fluidizing gas is admitted through conduit 25 controlled by valve 26. The gas is passed through an electric preheater 27 and thence to fluidization chamber 11 via conduit 28. The velocity of the gas is maintained by any appropriate means (not shown) at a level sufficient to keep the catalyst particles in a fluidized state. The gas passes through the activator 10 exiting through port 29 in chamber 12. The gas and any entrained particles pass via conduit 30 to separator 31 wherein such particles are removed from the exhaust gases.

During activation, screen 16 is in the lowered position forming a seal to prevent catalyst from falling below the screen. After activation, the purge gas, such as nitrogen passed through conduit 33 and controlled by valve 34, is turned off, screen 16 is raised and catalyst discharges through the discharge port 32 to a dry container 38 via conduit 39, controlled by valve 35. The container is blanketed with an inert gas, such as nitrogen, which is admitted through conduit 36 controlled by valve 37.

Appropriate thermocouples (not shown) and other control apparatus are advantageously placed to monitor and regulate the induction chamber temperatures, measure and control catalyst preheating temperatures, and measure and control fluidization gas temperatures, etc. With such a system, sensitive temperature control can be attained wherein accurate activation temperature programs can be easily programmed and reproduced.

The monomers which can be polymerized in accordance with the present invention are the aliphatic 1-olefins having 2–8 carbon atoms. Specific examples of this group include ethylene, propylene, isobutylene, butene, 1-octene, and the like, with ethylene being considered the preferred monomer. The present invention is also applicable to the production of copolymers of the aforesaid aliphatic 1-olefins with organic compound copolymerizable therewith.

The process is especially suited to the copolymerization of ethylene with small amounts, generally not exceeding 30% by weight of the ethylene, of propylene, isobutylene, butene-1, hexene-1, styrene, 4 methyl pentene-1, methyl methacrylate, ethyl acrylate, etc. It is preferred to use from 0.1–10% of the comonomer, based on the weight of the aliphatic 1-olefin.

The polymerization or copolymerization of the above listed monomers can be conducted in accordance with procedures and techniques well known to those skilled in this art. In general, the reaction is carried out at a temperature of 100°–350° F., preferably 190°–240° F., under a pressure which can vary from atmospheric to several thousands pounds per square inch.

The reaction can be conducted in a gaseous phase, a liquid phase, or a mixed gas-liquid phase. Normally, it is desirable to have present a diluent which aids in the control of the polymerization and which is chemically inert and nondeleterious to the catalyst under reaction conditions. Recognized diluents are the paraffins and cycloparaffins having 3 to 12 carbon atoms per molecule. Suitable diluents include propane, isobutane, normal butane, isopentane, normal pentane, isooctane, dodecane, cyclopentane, methyl cyclopentane, cyclohexane, methylcyclohexane, dimethyl cyclohexane, benzene, toluene, xylene, ethylbenzene, and the like. It is known, however, that the aromatic hydrocarbons having 6 and 12 carbon atoms per molecule are not advantageous as the paraffins and cycloparaffins in that they tend to deactivate the catalyst. Yet such diluents can be used in the practice of this invention.

The actual pressure utilized is chosen to assure that the diluent, when a liquid diluent is used, is maintained as a liquid phase and that the olefinic monomers not liquified under the reaction conditions are dissolved in the liquid phase in sufficient amount. Preferred pressures are on the order of 50 to 1000 p.s.i.

The reactants may be contacted with the catalyst in manners which are well known to those skilled in the art. For example, a fixed catalyst bed may be used, or a fluidized bed, or where the catalyst is suspended in a diluent and maintained in suspension by agitation.

The following examples are set forth to more fully describe the practise of the present invention. They should not be considered as a limitation upon the scope of the invention, but merely as being illustrative thereof.

EXAMPLE

Approximately 0.7 lb. of a supported chromium oxide catalyst, comprising two percent chromium trioxide on a silica gel support, was charged to the activator described herein. The induction heating cycle was started and the temperature carefully controlled. Dry, preheated air containing 0.9 part per million of water vapor, was fed into the activator bed at a rate to maintain a superficial air velocity in the catalyst bed of 0.3 foot per minute, which served to fluidize the catalyst and to carry away the moisture released from the catalyst as it heated up. The temperature control cycle was programmed to heat gradually to 700° F., maintain the temperature at 700° F., for an hour and was followed by heating to 1550° F., gradually in the course of three hours. Following the preheat cycle, the catalyst was maintained in the fluidized state at 1550° F., for six hours, after which it was cooled with air to 600° F., in the course of two hours, by shutting off the induction heating unit. When the temperature in the catalyst bed reached 600° F., the air flow was stopped and dry nitrogen containing 0.5 part per million water vapor was fed through the catalyst bed at 0.3 foot per minute superficial velocity. When the temperature in the catalyst bed reached 300° F., the nitrogen flow was stopped, the catalyst support screen raised and the catalyst allowed to flow into a catalyst container carefully purged with dry nitrogen. In Table I, Runs 1 through 10 employed catalyst activated in the above described manner wherein induction coils of 10 kilocycles per second frequency were used to control and maintain the activation temperature in the catalyst bed. Runs 11 and 12 employed catalysts activated in the same manner and at the same temperature, except that hot air was used on the outside jacket to control and maintain the activation temperature. All catalysts used in the examples were from the same lot.

In demonstrating the usefulness of the activated catalyst a slurry-type polymer reactor of 88 gal. capacity was employed. To this reactor there was added continuously 50 pounds per hour of carefully purified normal pentane, freed of oxygen, water and oxygenated compounds. Carefully purified ethylene, also free of water, oxygen, carbon monoxide and sulfur containing compounds was fed to the reactor at a rate of about 27.5 lbs. per hour to maintain five weight percent ethylene in the reactor. Activated catalyst was fed into the reactor at a rate of about 0.002 to 0.006 pound per hour and controlled to maintain a constant polymerization rate of 25 pounds per hour. Carefully purified butene, free of oxygen, water and oxygenated compounds, was fed to the reactor at a controlled rate to maintain a constant ratio of ethylene to butene in order to control the amount of butene incorporated in the polymer and hence to control the density of the ethylene copolymer. The synthesis temperature was maintained in the range of 210–220° F. The copolymeric product produced in the reactor was continuously withdrawn from the reactor at a rate of about 25 pounds per hour, freed of pentane, butene and ethylene by evaporation and collected as a dry powder, which was analyzed for melt index and density via conventional ASTM procedures.

The polymerization of the ethylene polymer in Runs 1–12, as found in the following table, was conducted in accordance with the above described process.

As is shown in the table below, the melt index of the polymer synthesized with the induction-heated activated catalyst is much higher than the melt index of the copolymer produced with the catalyst activated under conventional conditions.

3. The process of claim 1 wherein the catalyst is activated with induction means operated at about 8 to 12 kilocycles.

4. The catalyst produced in accordance with claim 1.

5. The process of claim 1 wherein the catalyst is heated inductively for about 4 hours to about 12 hours.

6. A process for the activation of a chromium oxide catalyst which comprises maintaining said chromium oxide catalyst in a fluidized state and subjecting said fluidized catalyst to an elevated temperature attained by inductively heating said catalyst.

7. A process for the activation of a chromium oxide catalyst which comprises preheating said catalyst, maintaining said catalyst in a fluidized state, and subjecting said catalyst to an elevated temperature attained by inductively heating said catalyst.

8. A process for activating a polymerization catalyst which comprises maintaining a chromium compound which is calcinable to chromium oxide on a support in a fluidized state and subjecting said fluidized catalyst to an elevated temperature attained by inductively heating said catalyst.

9. A process for activating a polymerization catalyst which comprises maintaining chromium oxide on a support in a fluidized state and subjecting said fluidized catalyst to an elevated temperature attained by inductively heating said catalyst.

TABLE

| Run No. | Synthesis Temp., °F. | Ethylene [1] Conc. (wt. percent) | Butene-1 [2] Conc. (wt. percent) | Melt index | Density (g./cc.) | Type of catalyst activation |
|---|---|---|---|---|---|---|
| 1 | 213.5 | 5.0 | 0.33 | 0.30 | 0.9515 | Induction heated. |
| 2 | 213.5 | 5.0 | 0.33 | 0.26 | 0.9518 | Do. |
| 3 | 214.6 | 5.0 | 0.33 | 0.41 | 0.9523 | Do. |
| 4 | 215.0 | 5.0 | 0.34 | 0.46 | 0.9523 | Do. |
| 5 | 215.0 | 5.0 | 0.30 | 0.41 | 0.9531 | Do. |
| 6 | 215.0 | 5.0 | 0.33 | 0.46 | 0.9523 | Do. |
| 7 | 212.3 | 5.0 | 0.30 | 0.29 | 0.9528 | Do. |
| 8 | 212.5 | 5.0 | 0.31 | 0.33 | 0.9537 | Do. |
| 9 | 212.7 | 5.0 | 0.31 | 0.33 | 0.9533 | Do. |
| 10 | 213.0 | 5.0 | 0.30 | 0.30 | 0.9515 | Do. |
| 11 | 213.0 | 5.0 | 0.33 | 0.09 | 0.9516 | Hot air jacketed heated. |
| 12 | 214.5 | 5.0 | 0.30 | 0.13 | 0.9517 | Do. |

[1] Based on total reactor contents.
[2] Based on total feed (diluent and ethylene).

While the invention has been described with reference to preferred embodiments thereof, it will be understood by those skilled in the art that various changes in form and details may be made therein without departing from the true spirit and scope of the invention.

What is claimed is:

1. In a process for preparing a catalyst comprising chromium oxide and at least one member of the group consisting of silica, alumina, thoria and zirconia as a support, the improvement which comprises activating said catalyst in a fluidized state by heating inductively at about 1000° F. to about 2000° F. for about 60 minutes to 20 hours.

2. The process of claim 1 wherein the catalyst is activated with induction means operated at about 1 to 20 kilocycles.

References Cited

UNITED STATES PATENTS

| 3,172,882 | 3/1965 | Witt | 260—94.9 |
| 3,225,023 | 12/1965 | Hogan et al. | 260—94.9 |
| 3,239,498 | 3/1966 | Witt | 260—94.9 |
| 3,281,405 | 10/1966 | Hogan | 260—94.9 |
| 3,322,691 | 5/1967 | Craven | 252—458 |

FOREIGN PATENTS 896,305  5/1962  Great Britain.

DANIEL E. WYMAN, *Primary Examiner.*

C. F. DEES, *Assistant Examiner.*

U.S. Cl. X.R.

252—465, 469